Dec. 25, 1928.　　　　　　　　　　　　　　　　　1,696,392
C. W. EGGENWEILER ET AL
MACHINE FOR TRIMMING THE EDGES OF BEARINGS OR LIKE SECTIONS
Filed Feb. 9, 1926　　　　6 Sheets-Sheet 1

Inventors
Charles W. Eggenweiler
William J. Fregel

Attorneys

Dec. 25, 1928.  1,696,392
C. W. EGGENWEILER ET AL
MACHINE FOR TRIMMING THE EDGES OF BEARINGS OR LIKE SECTIONS
Filed Feb. 9, 1926    6 Sheets-Sheet 3

Inventors
Charles W. Eggenweiler
William J. Fregel

By ~~~~ Attorneys

Patented Dec. 25, 1928.

1,696,392

UNITED STATES PATENT OFFICE.

CHARLES W. EGGENWEILER AND WILLIAM J. FIEGEL, OF DETROIT, MICHIGAN, ASSIGNORS TO BOHN ALUMINUM AND BRASS CORPORATION, OF DETROIT, MICHIGAN, A CORPORATION OF MICHIGAN.

MACHINE FOR TRIMMING THE EDGES OF BEARINGS OR LIKE SECTIONS.

Application filed February 9, 1926. Serial No. 87,056.

The invention relates to machines for trimming bearings or like sections and refers more particularly to machines for trimming the edges of such sections.

One of the objects of the invention resides in an improved drive mechanism for a machine of this character, the drive avoiding the use of heavy fly wheels such as are ordinarily employed in punch presses, and machines of such character where intermittent reciprocation of a ram or like member occurs. Thus our invention provides a drive mechanism of a simple relatively light character, the machine being conveniently capable of installation on the upper floors of a building where relatively heavy machinery cannot ordinarily be located.

A further feature of the invention resides in the provision of a safety device whereby the drive mechanism for the machine cannot be operated before the bearing or like section is positioned and clamped ready for the trimming operation.

A still further feature of the invention resides in providing means for regulating the thrust of the clamping members which hold the bearing section in position for the trimming operation.

With these and other objects in view, the invention resides in the novel features of construction and combination and arrangements of parts as more fully hereinafter described and claimed.

Before describing in detail the drive mechanism and the safety drive control we will first describe the other features of the machine for the most part described and claimed more particularly in our Patent Number 1,626,924, issued May 3, 1927.

In general our machine comprises the bed plate 1, the vertically movable ram 2, the cutters 3 upon the front face of the ram and the cooperating front and rear, or inner and outer clamping members 4 and 5 respectively for securing the section 6 of the bearing or the like in operative position.

The rear portion of the ram 2 is flared rearwardly and one of its side faces 7 and its rear face 8 slidably engage corresponding faces upon the upright 9 which is secured upon the bed plate 1. The other side face 10 of the flaring portion of the ram slidably engages the inner side face of the gib 11 which latter is secured to the upright 9 by means of the bolts 12 extending through the rear wall of the upright and threadedly engaging the gib and the nuts 13 threaded upon the rear ends of the bolts and abutting the rear wall. To properly align the inner side face of the gib with the adjacent side face of the flaring portion of the ram, the outer side face of the gib is relieved except at its front portion 14 providing a face of comparatively small length for bearing upon the adjacent face of the upright. Also the holes in the rear walls of the upright through which the bolts 12 extend are of sufficient diameter to provide clearance. With this arrangement the contacting faces of the gib and flaring portion of the ram properly align since the gib may rock about the front portion 14 of its outer face. This portion is preferably located at right angles to the center of the inner side face of the gib to facilitate the alignment.

The ram 2 is vertically reciprocated by suitable means described hereinafter. The cutters 3 are adjustably mounted upon the ram to vary the distance between the cutting edges and the front face of the ram and thereby vary the amount of cut upon the bearing or like section. As shown, each cutter is of progressively increasing thickness from its upper toward its lower end and its rear face 15 is inclined relative to the vertical and abuts the wall 16 of the cutter holder 17. This wall 16 has the same inclination as the rear face of the cutter and has a constant thickness. The cutter is secured to this wall by the screw bolts 18 which extend through the cutter and the wall and threadedly engage the plate 19 abutting the rear face of the wall. The apertures in the wall through which the screw bolts pass are vertically elongated so that upon vertically moving the cutter 3 relative to its holder the extent to which the cutting edges of the cutter project beyond the front face of the ram is varied. As shown the cutter is vertically adjusted by the screws 20 abutting its upper and lower ends and threadedly engaging in the lugs 21 at the upper and lower ends of the holder 17. This holder 17 is fixedly secured to the ram by suitable means such as the screw bolt 22, the ram being recessed to receive a portion of the holder.

The rear clamping member 5 is secured to the slide 23 which is transversely reciprocable in the upright 9 and slidably engages the same. This clamping member comprises the vertically extending core 24 and the vertically extending shell 25. The core 24 has the rearwardly extending tongue 26 engaging in the vertical groove 27 in the front face of the slide 23. 28 are screw bolts extending through the core 24 and threadedly engaging the slide, these screw bolts being located on opposite sides of the vertical center of the core. The tongue 26 is made convex so that by adjusting the screw bolts the vertical alignment of the front face of the core may be secured by rocking the core on the convex face. The shell 25 is made resilient, being relatively thin between its edges and is curved so that its outer radius is less than the inner radius of the bearing or like section to accommodate sections varying slightly in thickness of wall. This shell has near its opposite edges vertical grooves engageable with vertical tongues 29 upon the core whereby the shell is secured to the core. Also the front or intermediate portion of the shell is spaced from the core. For limiting the downward movement of the shell relative to the core, there is the screw bolt 30 threaded into the core and having its head projecting beyond the side edge of the core to form a shoulder engageable by the lower end of the shell.

The front clamping member 4 has its rear face made concave with a radius equal to the outer radius of the final bearing or like section. Thus the bearing is located from the outside surface for the cutting operation, the shell 25 merely serving to clamp the bearing in place. This outer surface of the bearing is preferably a finished surface so that by locating the bearing from the outer surface, as distinguished from the inner surface, any irregularities in bearing wall thickness will not affect the final transverse height of the bearing after the cutting action. This clamping member has secured thereto the bearing or like section supporting member 31 which is detachably secured by suitable means such as the screw bolt 32. This supporting member has an upwardly extending projection 33 extending adjacent to the rear concave face of the front clamping member. This supporting member is interchangeable with other supporting members having projections of different heights, it being essential that the proper supporting member be used to secure the longitudinal center of the bearing or like section in horizontal alignment with the longitudinal center of the core 24 of the rear clamping member. The front clamping member 4 is rigidly secured by suitable means, such as screw bolts, to the arm 34 which is pivotally connected at 35 to the lever 36. This lever is journaled upon the shaft 37 which extends transversely through the vertically extending bifurcations 38 upon the bed plate 1 at its front end, these bifurcations being connected at their rear edges by the integral wall 39 which is positioned in front of the front clamping member 4 when the latter is in operative position. The arrangement is such that with the front clamping member in operative position the lever 36 may be swung forward or in a counterclockwise direction about the rock shaft 37 thereby raising the clamping member and moving the same forward by means of the arm 34, the free end of the arm 34 sliding over the upper edge of the wall 39. The free end of the lever 36 is provided with the transverse handle 40 for facilitating the movement of the front clamping member.

For the purpose of actuating the slide 23 after the front clamping member 4 has been moved to operative position, to thereby clamp the bearing or like section 6 in position there is the lever 41 secured upon one end of the rock shaft 37 adjacent to a bifurcation 38. The rock shaft has rigidly secured thereto the cam 42 which is located between the bifurcations 38 and which upon rotation of the rock shaft is engageable with the upwardly extending end 43 of the draw bar 44 which extends longitudinally of the bed plate 1 beyond the upright 9 and beneath the slide 23. The front and rear ends only of the draw bar are supported upon the bed plate and clearance 23$^a$ is provided between the draw bar and slide and likewise clearance 23$^b$ may be provided, the arrangement being such that the draw bar may freely spring in a vertical plane. 45 is a post having a hub 46 sleeved over the rear end of the draw bar and positioned by means of the nuts 47 threadedly engaging the rear end of the draw bar at opposite ends of the hub. The post 45 extends upwardly between the bifurcations 48 at the rear end of the slide 23 and is secured thereto by the transverse pin 49.

To compel movement of the rear clamping member and the slide to which this clamping member is secured rearwardly or away from the front clamping member there is the bell crank lever 50 which is pivotally mounted at 51 between the bifurcations 38 and above the upwardly extending end 43 of the draw bar. This bell crank lever has a depending portion 52 which is engageable with the front face of the upwardly extending end 43 of the draw bar and the rearwardly extending portion 53 which is curved downwardly and is engageable with the cam 42 when the lever 41 is swung rearwardly and returned to its original position.

For the purpose of positioning the side edges of the bearing or like section 6 so that they will extend transversely of the machine when the section is in its clamped position there are the fingers 54 upon opposite sides of the slide 23 and having their forward ends adapted to engage the side edges of the bearing or like section. These fingers are journaled upon the gudgeons 55 which are in alignment and extend from opposite sides of the square block 56. This square block is positioned in the square hole 57 extending transversely through the slide 23, the hole having a length greater than that of the block. The slide 23 is also provided with a bore 58$^a$ slidably receiving a block 58$^b$, the latter being slotted at 58$^c$ to receive the lower end 58$^d$ of the bell crank 58$^e$, the upper end 58$^f$ of the bell crank being acted on by an adjustable countersunk set screw 58$^g$. 58$^h$ is a pin pivotally supporting the bell crank. 58 is a coil spring abutting at one end within the block 58$^b$ and extending forwardly into the block 56 and abutting the same, this spring normally tending to move the block 56 forwardly and also the fingers 54. To regulate the compression of spring 58 and hence the thrust of fingers 54, the set screws 58$^g$ may be adjusted, when slide 23 is in the rearward position clearing the upright 9, the set screw acting through bell crank 58$^e$ to move the block 58$^b$ which acts against spring 58. Thus if the bearings tend to stick in the clamping members, the spring 58 may be readily adjusted to afford greater thrust on the fingers 54. 59 is a yoke having the arms 60 slidably engaging in grooves in the opposite sides of the slide 23. These arms are located at opposite ends of the pin 49 and thereby hold the latter from accidental disengagement. 61 is a rod pivotally connected at 62 to the post 45 in rear of the pin 49. This rod extends through the base 63 of the yoke and has threaded upon its rear end the nuts 64. 65 is a coil spring surrounding the portion of the rod between the base of the yoke and the abutment washer 66 which rests against the front nut. The arms 60 of the yoke have at their front ends the forwardly projecting lower portions 67 and the fingers 54 have near their rear ends the depending lugs 68 which are positioned so that their rear faces are engageable with the front faces of the arm portions 67 when the yoke is moved forwardly. After the fingers have engaged the side edges of the bearing or like section to properly align the same it is essential that these fingers be removed before the cutters 3 engage the side edges of the section. This is accomplished by providing the ram with the inner shoulders 69 there being a shoulder for each finger. These shoulders pass on opposite sides of the slide 23 while the ram is descending and are curved upwardly and rearwardly, their lever portions being located below the cutters.

It is also essential that the fingers be held from engaging the finished side edges of the bearing or like section after the cutters have passed upwardly beyond the same. For this purpose there is the pawl 70 which is pivotally mounted at its rear end upon the upright 9 in rear of the ram. This is curved rearwardly and downwardly and has the nose 71 which is engageable with the front face of the base 63 of the yoke when the latter has been moved rearwardly by the downward swinging movement of the fingers 54. The pawl also has, at its free end and in advance of the nose 71, the shoulders 72 which is engageable with the upper inclined surface 73 of one of the bifurcations at the rear of the slide 23, whereby upon rearward movement of this slide the pawl will be swung upwardly and its nose disengaged from the yoke.

It is also essential that the trimmed side edges of the bearing or like section 6 be moved away from the path of travel of the cutters while the latter are returning to their original positions after the cuts have been made. For this purpose the ram 2 is provided with the adjustable set screw 74 which is preferably located above the uppermost cutting edges of the cutters 3. The set screw is engageable with the lever 75 which is pivoted at 76 upon the bed plate 1. 77 is a rock shaft journaled in the rear ends of the bifurcations 38 near their bases. 78 are cams keyed upon the ends of the rock shaft 77 adjacent to the outer faces of the bifurcations 38. 79 is a wedge shaped backing plate for the arm 34 having a slightly greater thickness at its upper end than at its lower end. The rear face of the wall 39 is inclined upwardly and for engagement by the front face of the backing plate whereby upon upward movement of the backing plate the arm 34 and front clamping member 4 may move forwardly toward the operator. The backing plate 79 is provided at its opposite ends with the projections 80 which are engageable with the cams 78. The rear end of the lever 75 is engageable with one of these cams so that as this lever is rocked about its pivot by the set screw upon the ram the backing plate will be raised allowing the first clamping member to move forward thereby providing clearance between the side edges of the bearing or like section and the cutters.

For the purpose of maintaining the backing plate 79 normally in its lowermost position the rear face of the backing plate and the front face of the wall 39 are provided with complementary recesses which together receive the vertically extending coil spring 81. When the backing place is moved upwardly the coil spring is compressed and tends to move the backing plate downwardly as soon as the pressure exerted by the cams 78 is removed. To facilitate the movement of the backing plate 79 over the wall 39 and also to maintain the backing plate adjacent to the wall the latter is provided with the oil passageway 82 which leads to the recesses containing the coil spring 81. This oil passes from these recesses between the adjacent surfaces of the wall and backing plate and produces an oil film which will hold the backing plate to the wall but permit relative sliding movement therebetween.

It is very important that the front clamping member 4 be freely movable to a limited extent to properly align with the rear clamping member 5 in order to properly clamp the bearing or like section 6 therebetween. Therefore the hole in the lever 36 provides considerable clearance for the pin 35 connecting this lever to the arm 34. Furthermore, the rear face of the backing plate 79 is provided with vertically spaced points of contact for the arm 34 and the bed plate 1 has secured thereto the hardened supporting plate 83 which has a limited area of contact with and affords the only support beneath the clamping member and its arm. This plate is located adjacent to the rear end of the clamping member. Horizontal movement of the clamping member is also provided for, the portion of the pin 35 which is adapted to be engaged by the arm 34 being longer than the width of the arm to provide clearance for movement of the latter longitudinally of the pin. The lever 36 also has a depending portion 36' below its pivot for engagement with the set screw $36^2$ which is adjustably secured to the bed plate. With this latter arrangement the weight of the lever is removed, whereby easier adjustment of the front clamping member is obtained.

To hold the slide 23 and rear clamping member 5 in their rearwardly adjusted positions there is the coil spring 84, the rear end of which abuts the abutment washer 66 and the front end of which abuts the housing 85 carried by the arm 86, the front end of which is secured to the upright 9. This spring is placed under compression upon forward movement of the rear clamping member and assists in returning the same and associated parts to their original positions. This spring also exerts sufficient force to normally retain the parts in their original positions.

To prevent damaging of the machine in the event that the bearing or like section is not properly clamped in place when the ram is tripped there is the cam plate 87 which is secured to the side of the ram 2 near its front. The lower end of this cam plate is inclined upwardly and forwardly. 88 is a bell crank lever pivotally mounted at 89 upon the bed plate and having an upwardly extending arm 90, which is provided with the transverse projection 90' for engagement with the lower inclined end of the cam plate 87. The bell crank lever also has the forwardly extending arm 91 which is provided with the transverse projection 92 engageable with the hooked or cammed end 93 of the lever 41. This hooked or cammed end is shaped to compel swinging of the bell crank lever 88 about its pivot to move the transverse projection at the upper end of the bell crank arm 90 from the path of travel of the cam plate 87 when the lever 41 is swung forwardly to clamp the bearing or like section. Therefore, if the lever 41 were in its original position and the ram were tripped, downward movement of the ram would bring the cam plate into engagement with the transverse projection upon the upwardly extending arm of the bell crank lever compelling the same to swing thereby forcing the lever to swing forwardly to move the associated parts including the rear clamping member to their proper positions. As a consequence the ram or the cutters will cause no damage during their continued downward movement.

Referring now to the drive mechanism and safety control therefor, the ram 2 is reciprocated by a connecting or pull rod 96 preferably loosely engageable at 97 with the bottom of the ram so as to permit a limited amount of relative movement laterally for alignment of the ram and pull rod. Power may be taken from a suitable source such as a motor 98 driving a shaft 99 which extends through the clutch housing 100 and carries a relatively small fly wheel 101 at the other side of the housing. Within the housing is mounted a worm wheel 102 driven from a worm 103, the latter being mounted on the drive shaft 99. The worm wheel is formed with clutch jaws 104 engageable with the complementary jaws 105 of the axially slidable clutch member 106. The latter member is provided with a cammed portion 107 engageable by the lower end 108 of the reciprocatory clutch control rod 109, the latter being slidable in the bearing 110. Movement of the rod 109 in opposite directions is limited as by engagement of a fixed ball 111 in the slot 112 formed in rod 109. 113 is a weight carried by the rod 109 for normally urging the latter downwardly.

For manually controlling the movement of rod 109 and also the clutch the lever 114 is provided fixed to a rock shaft 115 which extends across the rear of the machine for convenient actuation by the handle lever 116.

The rear wall 117 of the clutch housing 100 is formed with a lug 118 engageable with the ring of friction braking material 119 held in non-rotative position by reason of the pins 120, the latter being fixed at one end with the friction ring 119 and being reciprocable by engagement of the other ends in bores 121 so that when the clutch member is urged into disengagement with respect to the clutch jaws 104 by reason of the cam 107 and rod 108, the machine parts including ram 2 will quickly be brought to rest through the braking action of the friction material 119 in contact with the adjacent face of the clutch member 106. The lug 118 establishes the limit of travel of member 106 and ring 119. For urging the clutch member 106 into clutching engagement and for simultaneously moving the friction ring 119 from lug 118 a series of springs 122 may be provided encircling pins 120, it being understood that when the clutch parts are in operative engagement the pressure from springs 122 will not cause appreciable braking between ring 119 and the clutch member 106.

The worm wheel 102 is loosely mounted on driven shaft 123 and the clutch member 106 is splined to this shaft so that upon engagement of clutch jaws 104 and 105 the shaft 123 will be driven from member 106. Thus, by moving handle lever 116 forwardly, the rod end 108 will be raised from cam 107 permitting springs 122 to move the clutch jaws 105 into engagement with jaws 104 establishing a drive between motor 98 and driven shaft 123. The weight 113 will force the rod end 108 downwardly so that after a single revolution of the shaft 123 the cam 107 will again be engaged with the rod end 108 automatically serving to disconnect the drive, the machine parts being brought quickly to rest by reason of the braking between friction ring 119 and member 106.

124 is a crank rotated from shaft 123, this crank carrying a pin 125 engageable in the outwardly flanged bushing 126. The latter bushing is connected by pins 127 with the cross head bearing slide 128 which operates in the slot 129 formed in the cross head 130. The pull rod 96 is secured at its lower end to this cross head. For guiding the cross head during its vertical reciprocations the slides 131 are formed at opposite sides of the crank housing 132 by the ribs 133 and 134. These latter ribs provide a bearing for the cross head to locate the same transversely while the opposite side faces of the central vertically extending rib 135 serves to afford bearings for the cross head at 136 to prevent longitudinal movement of the cross head.

Figure 1:
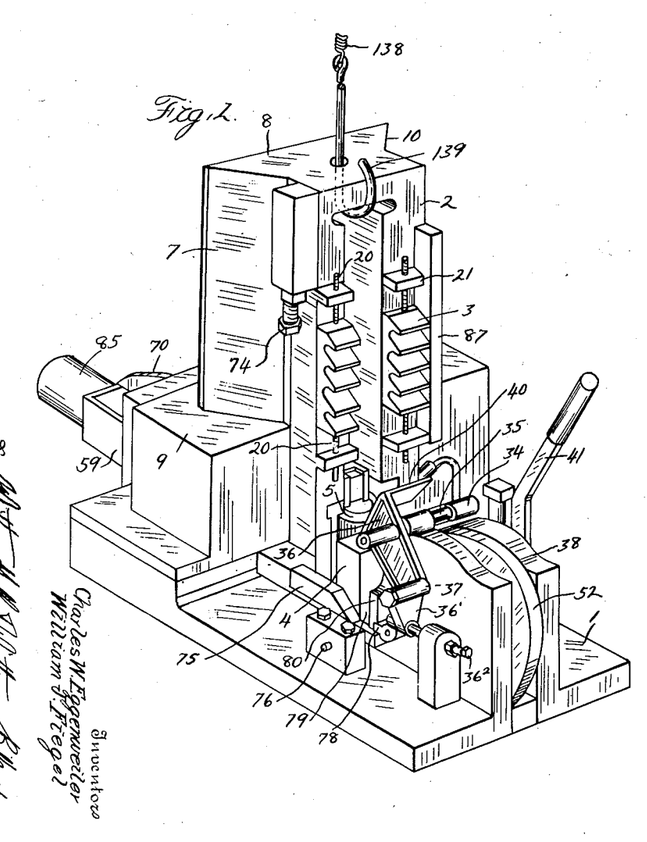
Figure 1 is a perspective view of a machine embodying my invention.
Figure 2:
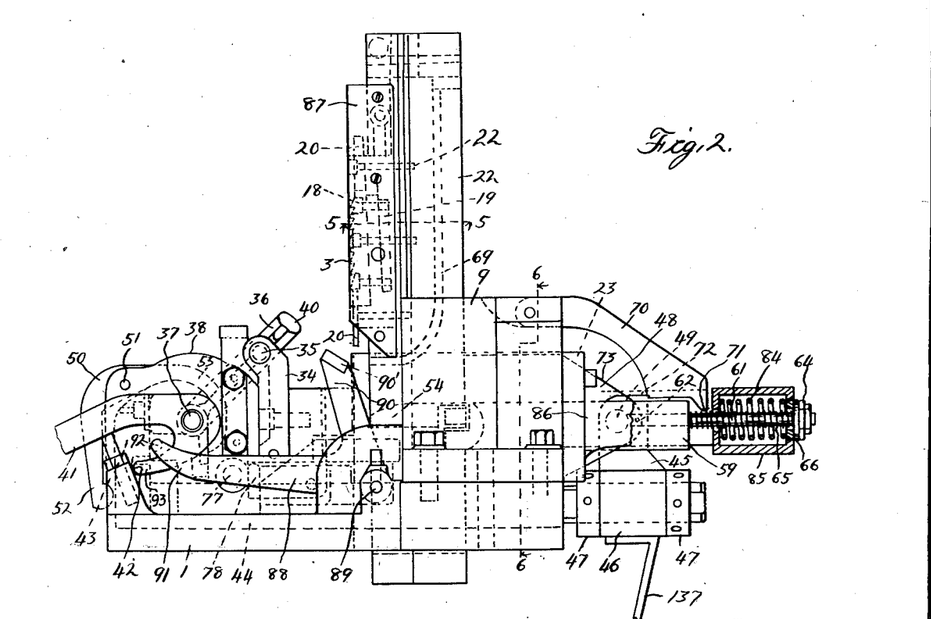
Figure 2 is a side elevation thereof.
Figure 3:
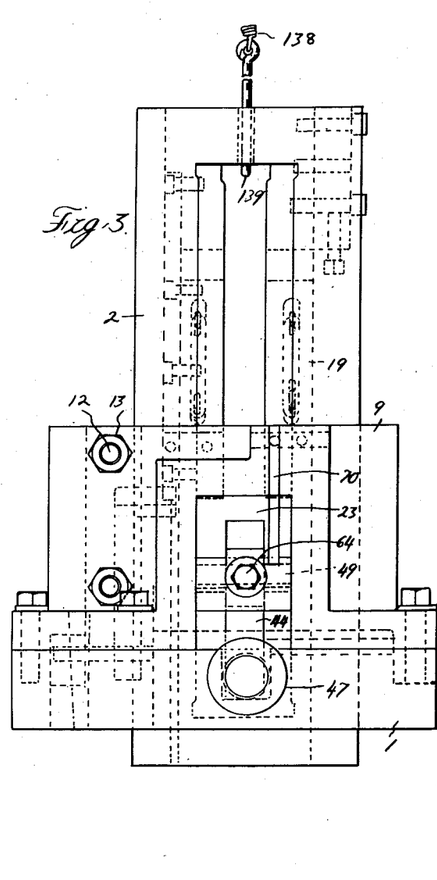
Figure 3 is a rear elevation thereof.
Figure 4:
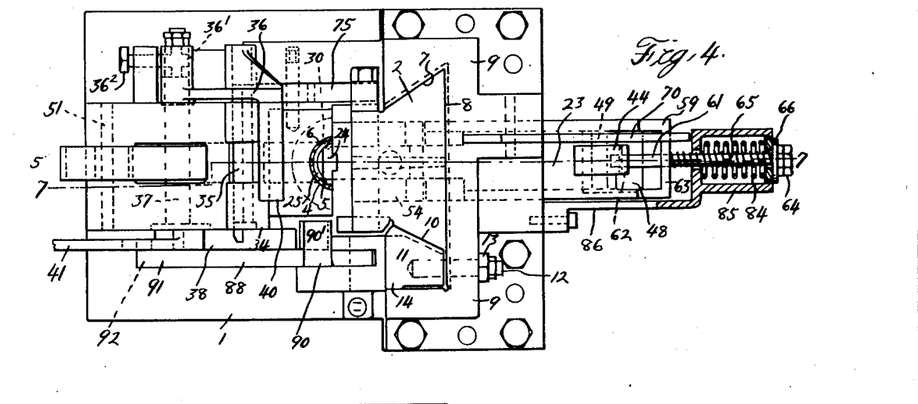
Figure 4 is a plan view thereof.
Figure 5:
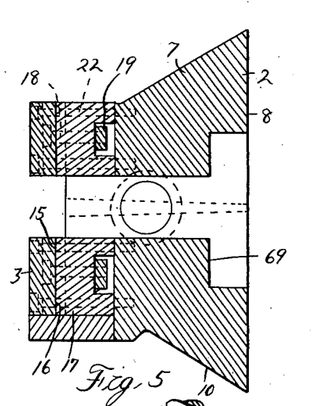
Figures 5 and 6 are cross sections respectively on the lines 5—5 and 6—6 of Figure 2.
Figure 6:
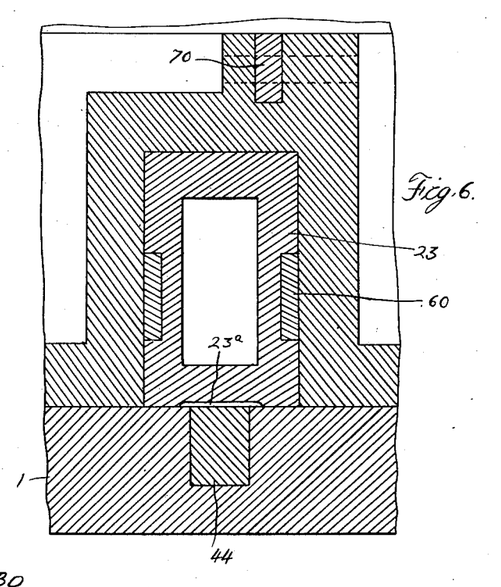
Figure 7:
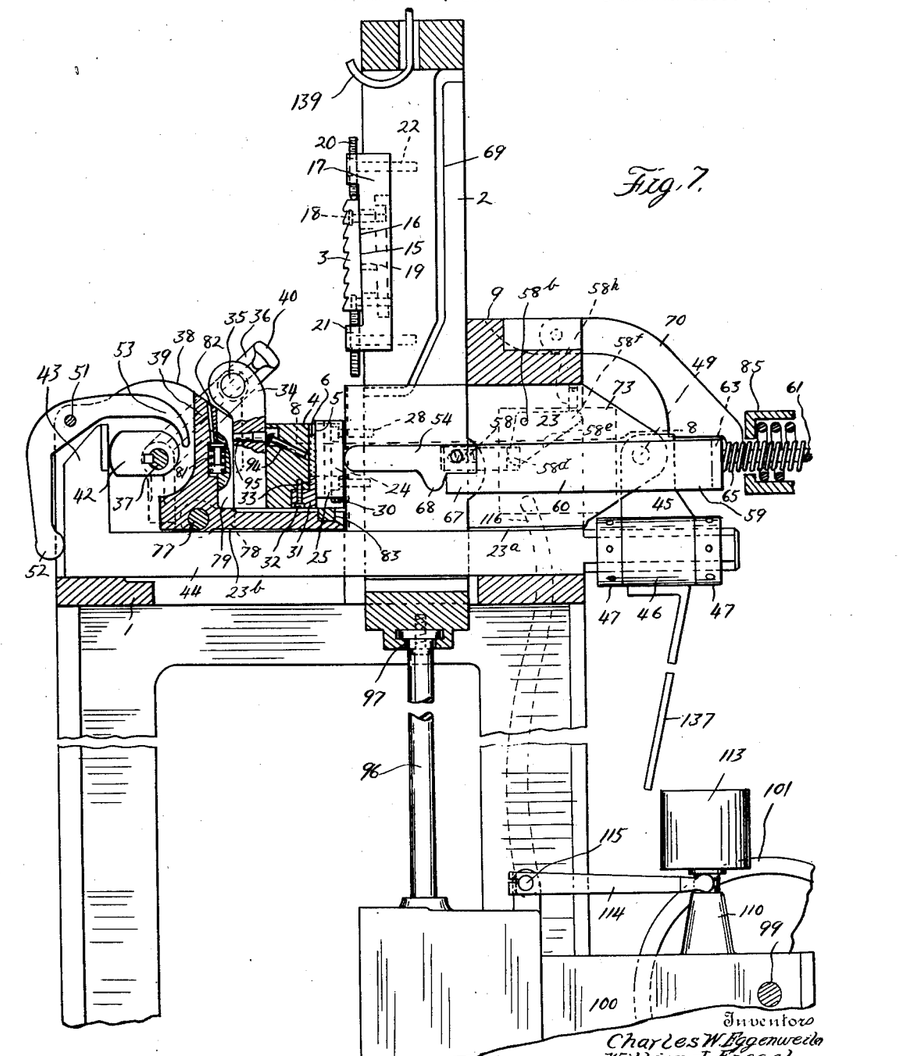
Figure 7 is a cross section on the line 7—7 of Figure 4.
Figure 8:
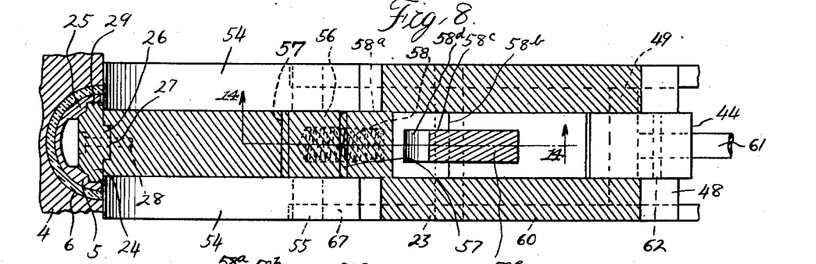
Figure 8 is a cross section on the line 8—8 of Figure 7.
Figure 9:
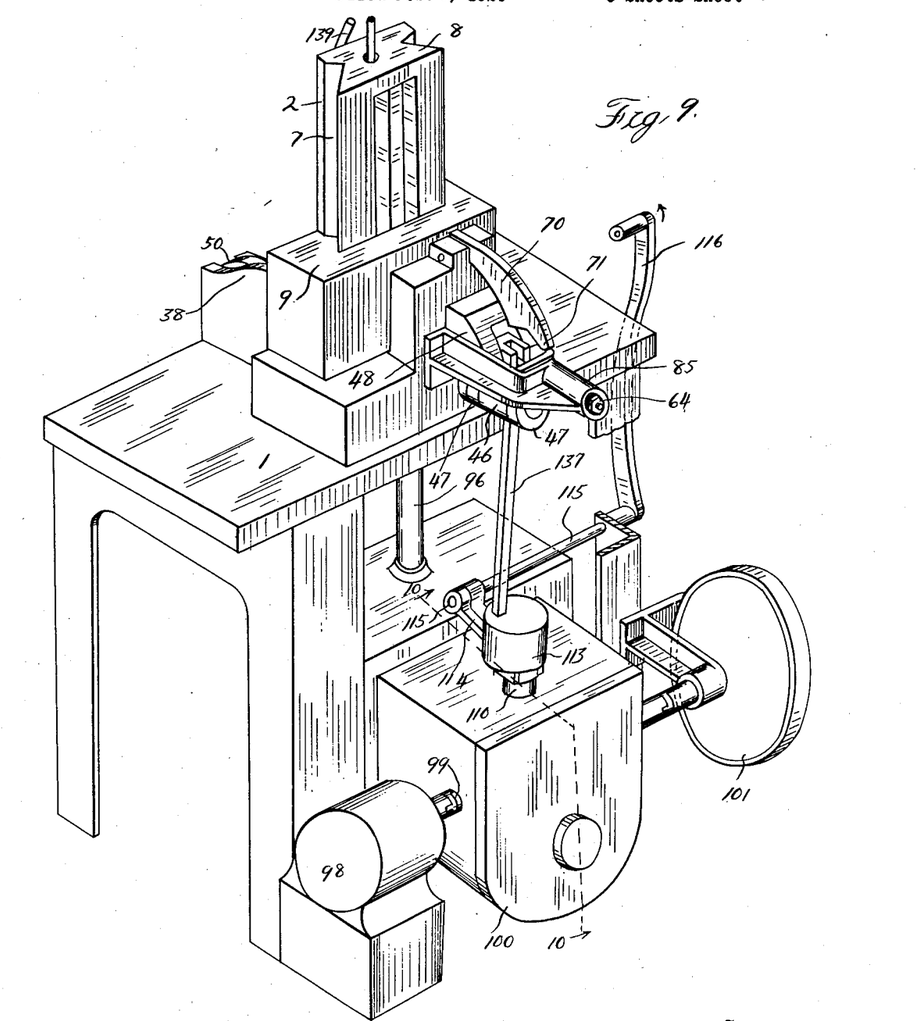
Figure 9 represents a rear perspective view of the machine showing the safety drive control.
Figures 10, 11, 12:
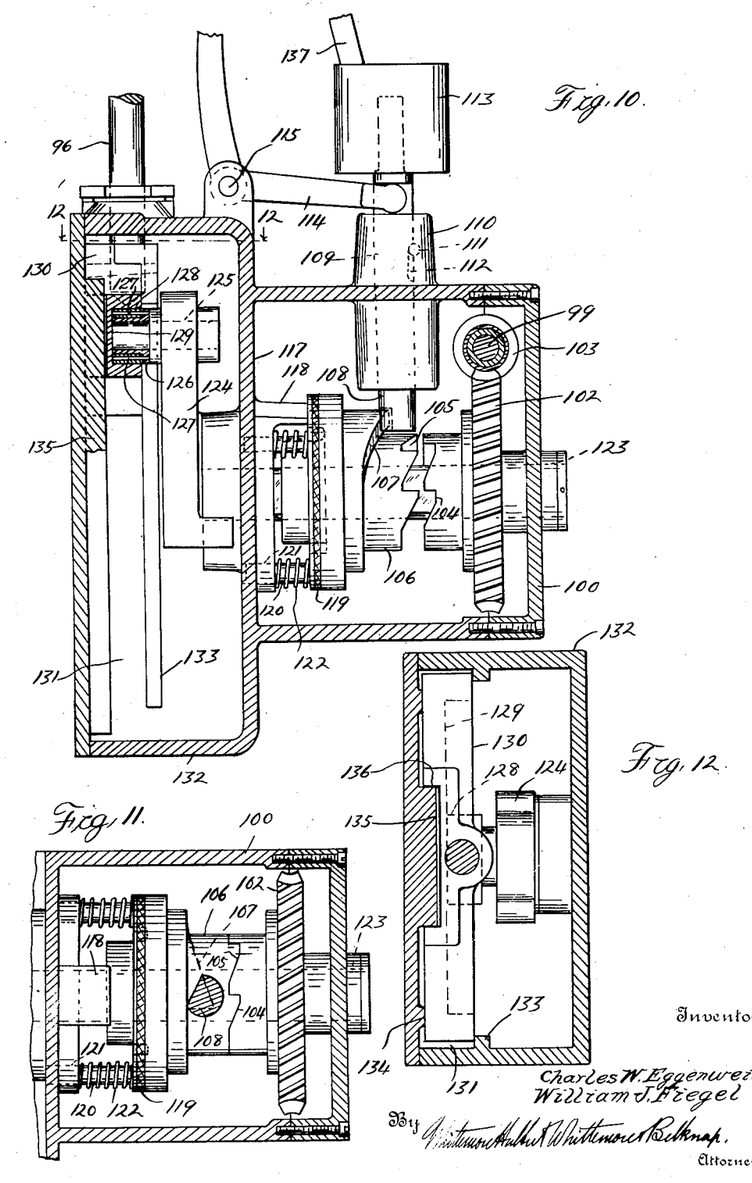
Figure 10 is a sectional elevation view 10—10 of Figure 9 showing the drive mechanism.
Figure 11 is a plan view showing the drive control mechanism in inoperative position.
Figure 12 is an elevation view through 12—12 of Figure 10 showing the cross head and guide therefor.
Figure 13:
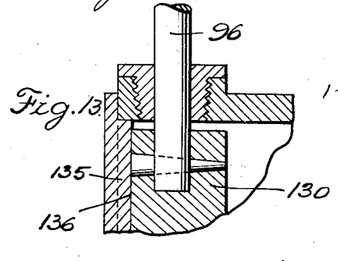
Figure 13 is a detailed sectional view showing the connection between the ram and operating crank.
Figure 14:
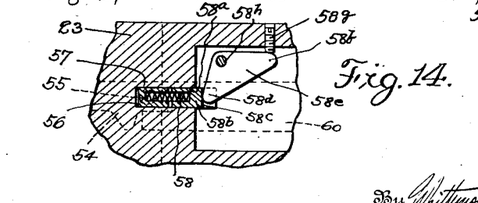
Figure 14 is a sectional view taken on the line 14—14 of Figure 8.

In order to prevent throwing in the clutch to start the machine before the bearing section 6 has been clamped in position, the hub 46 is provided with a downwardly extending arm 137 which is engageable above the weight 113 when the hub 46 is in its rearward position as shown in Figures 9 and 10. When the hub 46 is moved forwardly as in clamping the bearing section in position, the arm 137 will clear the weight 113 as shown in Figure 7 to permit actuation of the handle lever 116 to start the machine. With the parts in this position, the handle control lever 116 cannot be operated without first swinging lever 36 rearwardly and without first actuating lever 41 to move the draw bar 44 with arm 137 to effect the clamping of the bearing section in proper position.

If desired, a spring 138 may be provided connected by a hooked portion 139 with the ram serving to counterbalance the crank 124 without increasing the inertia at the crank as would result from the use of a weighted counterbalance. If the crank were counterweighted the inertia factor in starting would be sufficiently great to shear the clutch pins and otherwise damage the machine. The provision of spring 138 avoids this difficulty.

In operation and assuming the ram 2 and the cutters 3 to be in their upper or original positions, the lever 41 in its upper or original position and therefore the parts including the rear clamping member 5, which are operated by swinging the lever 41 in their rear or original positions and the front clamping member 4 located above the uprights 38. The bearing or like section 6 is placed in the front clamping member 4 and against the projection 33 of the positioning member 31. The lever 36 is then swung rearwardly allowing the front clamping member to swing down upon the bearing block 83 of the bed plate 1 and the front face of the arm 34 to rest against the vertically spaced bearings upon the backing plate 79 which is in its lowermost position. The lever 41 is then swung forwardly moving the bell crank 88 out of the path of travel of the cam plate 87. This lever through the rock shaft 37 and cam 42 moves the draw bar 44 forward which in turn through the post 45 moves the slide 23 and rear clamping member 5 forward and also the yoke 59 and fingers 54 forward, the free ends of the latter being positioned to engage the side edges of the bearing or like section prior to the final forward movement of the rear clamping member. This movement of the slide 23 and post 45 disengages the arm 137 from the weight 113 permitting starting of the machine cutting operation. During the forward movement of the rear clamping member 5, the front or intermediate portion of the shell 25 first engages the inner surface of the bearing or like section and then the shell gradually assumes the contour of the inner surface and in doing so its opposite edges slide outwardly upon the tongues of the core. The strength of the coil spring 58 determines the pressure exerted by the fingers upon the bearing or like section and when this pressure becomes equal to the strength of the spring the latter is compressed during the final forward movement of the slide and rear clamping member. The pressure exerted by the rear clamping member upon the bearing or like section is dependent upon the resistance offered by the draw bar to springing vertically. In other words, the draw bar buckles vertically if the lever 41 is swung forwardly after the predetermined pressure is exerted upon the bearing or like section. During this clamping operation the front clamping member is free to move so that its clamping face will be concentric with the clamping face of the rear clamping member. The operator then moves the handle lever 116 forwardly to trip the rod end 108 to cause engagement of clutch jaws 104 and 105 so as to produce a single revolution of the crank 125, the clutch member 106 being automatically disengaged from jaws 104 at this time. Thus the ram is reciprocated in a single cycle, first moving downwardly carrying the cutters, movement being imparted to the ram from the crank 125 through cross head 130 and pull rod 96. These cutters trim the side edges of the bearing or like section and after the last cutting edges of the cutters have passed the bearing or like section the set screw 74 upon the ram engages the lever 75 and through the rock shaft 77 and cams 78 raises the backing plate 79 against the effort exerted by the coil spring 81. The raising of this backing plate permits the front clamping member 4 to move forwardly to a slight extent under the pressure exerted by the draw bar 44 upon the slide 23 and rear clamping member 5, thereby providing clearance between the finished side edges of the bearing or like section and the cutters 3 so that upon the return movement of the latter the side edges of the bearing or like section are not engaged. During the initial downward movement of the ram and its cutters, the fingers 54 are swung downwardly and out of contact with the side edges of the bearing or like section by the cam shoulders 69 upon the ram engaging the fingers. This downward swinging of the fingers compels rearward movement of the yoke 59 and consequent increased compression of the coil spring 65, this spring having previously functioned to move the yoke and fingers forward. The rearward movement of the yoke is sufficient to permit engagement of the nose 71 of the pawl 70 with the front face of the base 63 of the yoke whereby the yoke is held from forward movement. The fingers 54 remain in their downward positions by their own weight. When the trimming of the side edges of the bearing or like section has been completed the lever 41 may be returned to its original position at which time the cam 42 upon the rock shaft 37 to which the lever is secured engages the rearwardly extending arm 53 of the bell crank 50 compelling the latter to swing about its pivot 51 and to move its depending arm 52 into engagement with the draw bar 44 thereby moving the latter rearwardly and correspondingly moving the slide 23 and rear clamping member 5. As the slide 23 is moved rearwardly its upper inclined face 73 comes into contact with the releasing portion 72 of the pawl 70 swinging the latter upwardly and disengaging its nose from the base of the yoke, when the coil spring 65 will then function to move the yoke 59 forward a sufficient distance to raise the fingers 54 to their original positions. Rearward movement of slide 23 also produces rearward movement of the arm 137 causing the same to again engage the weight 113 to lock the starting mechanism. Thus the machine cannot be started when the bearing section is not clamped in place insuring safety to the operator and preventing damage to the cutters and other parts of the machine. The front holding member 4 may then be returned to its original position at which time the bearing or like section may be removed. This removal is facilitated by means of the cooperating pins 94 and 95, the pin 94 slidably engaging in the front clamping member and the pin 95 slidably engaging in the arm 34 and being adapted to contact at one end with the pin 94 and at the other end with the upper edges of the backing plate 79 which has been returned to its original position by the coil spring 81 and the wall 39 and finally with the upper edge of the rearwardly extending arm 53 of the bell crank 50 which has been swung upwardly by cam 42. The arrangement is such that the pins function as ejectors for the bearing or like section.

What we claim as our invention is:—

1. In a machine for trimming bearing or like sections, a reciprocable ram, cutters carried by the ram for operation on said section, means for clamping the section in position for the cutting operation, a source of power, a pull rod, a crank establishing a driving connection between said source of power and said pull rod for reciprocating the ram, means for rotating said crank including a clutch, a rotatable cam associated with the clutch and operable thereby, causing the application of the power to impart a single revolution to the crank and hence a single complete cycle of reciprocation to the ram, and braking means operable by said cam and automatically responsive to the completion of the said crank revolution for quickly bringing the crank and ram to rest.

2. In a machine for trimming bearing or like sections, a reciprocable ram, trimming cutters carried by the ram for trimming a bearing, means for clamping the bearing in position for the cutting operation, resilient means exerting a thrust on the bearing for locating the bearing in the clamping means for aligning the bearing edges preparatory to the cutting operation, and adjustable means for regulating the said resilient thrust means.

3. In a machine for trimming bearing or like sections, a reciprocable ram, trimming cutters carried by the ram for trimming a bearing, means for clamping the bearing in position for the cutting operation, comprising inner and outer clamping members engageable respectively with the inner and outer surfaces of the bearing, resilient means exerting a thrust on the bearing for moving the bearing rotatively to locate the bearing edges in alignment preparatory to the cutting operation, and adjustable means for regulating the said resilient thrust means.

4. In a machine for trimming arcuate bearing or like sections having outer finished surfaces, a reciprocable ram, cutters carried by the ram for trimming the bearing edges, means for clamping the bearing in position for the cutting operation comprising an outer non-yielding clamping member engageable with the said finished outer surface of the bearing and an inner yielding clamping member engageable with the inner surface of the bearing, resilient means exerting a thrust on the bearing for moving the bearing rotatively between the clamping members to locate the bearing edges in alignment preparatory to the cutting operation, and adjustable means for regulating the said resilient thrust means.

5. In a machine for trimming bearing or like sections, means for clamping the section in position for the trimming operation including a bar reciprocable longitudinally of the machine, means for trimming the section, clutch controlled means for operating the trimming means, and means including an arm extending downwardly from one end of said bar and engageable with said last mentioned means for preventing operation of the trimming means without prior actuation of the clamping means.

6. In a machine for trimming bearing or like sections, a reciprocable ram, cutters carried by the ram for operation on said section, means for clamping the section in position for the cutting operation, a motor, a drive shaft, operable by said motor, a worm on said shaft, a second shaft, a worm wheel on the latter shaft meshing with said worm and having clutch jaws, a clutch member slidably mounted on said second shaft having jaws engageable with the jaws aforesaid and having a cam portion, a crank operable by said second shaft and connected to impart reciprocation to the ram, and a control member engageable with said cam for automatically disengaging said clutch member after a single complete cycle of reciprocation of the ram.

7. In a machine for trimming bearing or like sections, a reciprocable ram, cutters carried by the ram for operation on said section, means for clamping the section in position for the cutting operation, a motor, a drive shaft operable by said motor, a worm on said shaft, a second shaft, a worm wheel on the latter shaft meshing with said worm and having clutch jaws, a crank operable by said second shaft and connected to impart reciprocation to the ram, a clutch member axially slidable on said second shaft having jaws cooperating with the clutch jaws aforesaid for driving said second shaft, cam portion formed upon said clutch member and a spring influenced friction disk non-rotatively mounted with respect to the clutch member and engageable with the latter to urge the same into clutching engagement in one position of the cam and automatically responsive in another position of the cam to bring the crank and ram to rest.

8. In a machine for trimming bearing or like sections, a reciprocable ram, cutters carried by the ram for operation on said section, means for clamping the section in position for the cutting operation, a driven shaft, a clutch member slidably mounted on said shaft for applying power to reciprocate the ram and having a cam portion, a clutch control rod engageable with said cam portion, a member normally urging said control rod into engagement with said cam, and means carried by said clamping means engageable with said member for preventing actuation of said clutch member until the said clamping means has been actuated to clamp the section in position.

9. In a machine for trimming bearing or like sections, a reciprocable ram, cutters carried by the ram for operation on said section, means for clamping the section in position for the cutting operation, a driven shaft, a clutch member slidably mounted on said shaft for applying power to reciprocate the ram and having a cam portion, a vertical reciprocatory clutch control rod engageable with said cam portion, a weight mounted on the upper end of said rod normally urging the latter into engagement with the cam, and an arm carried by said clamping means engageable with said weight for preventing the upward movement of said control arm and hence actuation of said clutch member prior to the clamping means to clamp the section in position, is prevented.

10. In a machine for trimming bearing or like sections, a reciprocable ram, cutters carried by the ram for operation on said section, means for clamping the section in position for cutting operation, a driven shaft, a clutch member slidably mounted on said driven shaft for applying power to reciprocate the ram and having a cam portion, a vertical reciprocatory clutch control rod engageable with said cam portion and operable to disengage said clutch member upon a complete cycle of reciprocation of the ram, a spring pressed disk normally urging said clutch into engagement and operable to bring the ram to rest upon a disengagement of the clutch, and means operable by said clamping means and engageable with said clutch control rod normally holding the latter into engagement with said cam portion for preventing operation of the clutch to effect the cutting means without prior actuation of the clamping means.

11. In a machine for trimming bearing or like sections, a reciprocable ram, cutters carried by the ram for operation on said section, means for clamping the section in position for the trimming operation, a pair of relatively longitudinally movable clutch members for applying power to reciprocate the ram, the said longitudinally movable clutch member being formed with a cam portion, and a member controlled by the clamping means aforesaid and extending in the path of travel of the cam preventing actuation of said trimming means without prior actuation of said clamping means.

12. In a machine for trimming bearing or like sections, a reciprocable ram, cutters carried by the ram for operation on said section, means for clamping the section in position for the trimming operation a pair of relatively longitudinally movable clutch members for applying power to reciprocate the ram, the said longitudinally movable clutch member being formed with a cam portion, a spring influenced disk engageable with the last mentioned clutch member normally urging the same into engagement with the clutch member aforesaid, and a member controlled by the said clamping means and extending within the path of travel of the said cam for preventing actuation of the clutch members without prior actuation of the said clamping means and for automatically disengaging the clutch members to move one of the latter into engagement with the disk to bring the ram to rest.

In testimony whereof we affix out signatures.

CHARLES W. EGGENWEILER.
WILLIAM J. FIEGEL.